United States Patent
Takahashi et al.

(10) Patent No.: US 9,403,467 B2
(45) Date of Patent: Aug. 2, 2016

(54) UTILITY VEHICLE

(71) Applicant: KAWASAKI JUKOGYO KABUSHIKI KAISHA, Hyogo (JP)

(72) Inventors: Keiji Takahashi, Akashi (JP); Yoshinori Tsumiyama, Miki (JP); Itsuo Takegami, Kobe (JP); Kazuki Takeuchi, Kasai (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,532

(22) Filed: Dec. 30, 2014

(65) Prior Publication Data

US 2016/0185270 A1    Jun. 30, 2016

(51) Int. Cl.
*B60P 1/16* (2006.01)

(52) U.S. Cl.
CPC ........................................ *B60P 1/16* (2013.01)

(58) Field of Classification Search
CPC ........................................................ B60P 1/16
USPC ........ 298/17 B, 17 R, 22 R, 19 B; 280/763.1; 296/183.2; 180/69.21; 248/351, 352, 248/354.5, 354.6
See application file for complete search history.

(56) References Cited

U.S. PATENT DOCUMENTS 4,138,158 A * 2/1979 Jones .................. B60P 1/20
298/17 B
8,833,837 B2    9/2014 Kaku et al.

* cited by examiner

*Primary Examiner* — Stephen Gordon
(74) *Attorney, Agent, or Firm* — Wenderoth, Lind & Ponack, L.L.P.

(57) ABSTRACT

A utility vehicle includes: a chassis (1); a seat (6) arranged on the chassis; a cargo bed (8) arranged behind the seat and supported in a freely rotatable manner about a pivot (11) of the chassis so as to be changeable between a dumping position in which a front portion of the cargo bed is raised and a normal position in which the front portion of the cargo bed is not raised; a holding part (12) for biasing the cargo bed toward the dumping position so as to hold the cargo bed; and a support rod (101) provided separately from the holding part and supporting the cargo bed at the dumping position.

4 Claims, 7 Drawing Sheets

UTILITY VEHICLE

BACKGROUND OF THE INVENTION

1. Field of the Invention

The present invention relates to a utility vehicle and, in particular, to a utility vehicle whose cargo bed is constructed so as to be capable of a dumping operation.

2. Description of the Prior Art

For example, the specification of U.S. Pat. No. 8,833,837 discloses a utility vehicle comprising a cargo bed capable of a dumping operation.

In the utility vehicle described in the reference, the rear end part of the cargo bed is supported in a freely rotatable manner relative to the chassis. Then, the cargo bed can be raised from a normal position to a dumping position.

When the cargo bed is to be raised to the dumping position, the cargo bed is biased by manual operation or by using an assist mechanism such as a hydraulic cylinder and an air cylinder so that the front end part of the cargo bed is raised. Then, the cargo bed is held at a predetermined dumping position by using a biasing force of the assist mechanism alone.

However, in the assist mechanism in the utility vehicle of the conventional art, when the outside air temperature is extremely low (−20° C. to −30° C. or lower), operating fluid of the assist mechanism contracts so that the biasing force decreases. Thus, in some cases, the dumping position of the cargo bed varies so that the cargo bed cannot be held at a predetermined dumping position.

SUMMARY OF THE INVENTION

The present invention has been devised in consideration of the above-mentioned problem, and an object of the present invention is to provide a utility vehicle whose cargo bed can be held at a predetermined dumping position regardless of the outside air temperature.

In order to achieve the object, a utility vehicle according to the present invention comprises: a chassis; one or a plurality of seat row(s) arranged on the chassis; a cargo bed arranged behind the seat row(s) and supported in a freely rotatable manner about a pivot of the chassis so as to be changeable between a dumping position in which a front portion of the cargo bed is raised and a normal position in which the front portion of the cargo bed is not raised; a holding part for biasing the cargo bed toward the dumping position so as to hold the cargo bed; and a support rod provided separately from the holding part and supporting the cargo bed at the dumping position.

With the above-mentioned configuration, the utility vehicle comprises: the holding part for biasing the cargo bed toward the dumping position so as to hold the cargo bed; and the support rod provided separately from the holding part and supporting the cargo bed at the dumping position. Thus, the holding part can bias and raise the cargo bed to the dumping position and then can hold the cargo bed at a predetermined dumping position by means of the biasing force of the holding part. Also, the cargo bed can be held at a predetermined dumping position by the support rod. Thus, for example, in a case in which an air cylinder is employed as the holding part, even when the outside air temperature becomes extremely low so that the biasing force of the air cylinder decreases, the cargo bed can be held at a predetermined dumping position by the support rod. That is, the cargo bed can be held at a predetermined dumping position regardless of the outside air temperature.

In addition to the above-mentioned configuration, the present invention may preferably employ the following configurations.

(a) One end part of the support rod is attached to the cargo bed in a freely rotatable manner and the support rod can be moved between a storage position of being stored in the cargo bed and a supporting position of supporting the cargo bed.

With the configuration (a), one end part of the support rod is attached to the cargo bed in a freely rotatable manner so that the support rod can be moved between the storage position and the supporting position. Thus, for example, when the cargo bed is to be raised or lowered, storing the support rod in the storage position, except for a situation that the cargo bed is to be supported, prevents the support rod from disturbing the raising or lowering of the cargo bed or being lost.

(b) The utility vehicle further comprises a screen provided between the seat row(s) and the cargo bed; the screen has at least one crossbar extending in a vehicle width direction; the other end part of the support rod has a hook; and the hook can be locked to the crossbar.

With the configuration (b), the hook of the support rod can be locked to the crossbar of the screen. Thus, it is not necessary to provide separately a to-be-locked member for locking the hook of the support rod in the chassis or the like.

(c) The screen has a plurality of crossbars similar to the above-mentioned one.

With the configuration (c), the screen has the plurality of crossbars. Thus, when a different crossbar is used for locking the hook of the support rod, the dumping position of the cargo bed can be changed.

(d) The crossbar of the screen has a restriction pin for restricting a lock position for the hook in a vehicle width direction.

With the configuration (d), the crossbar of the screen has the restriction pin and then the restriction pin restricts the lock position for the hook in the vehicle width direction. Thus, the lock position for the hook in the vehicle width direction can be stabilized so that the cargo bed can be held stably at a predetermined dumping position.

BRIEF DESCRIPTION OF THE DRAWINGS

The above and other objects, features, and advantages of the present invention will become more apparent from the following description taken in connection with the accompanying drawings, in which.

DETAILED DESCRIPTION OF THE PREFERRED EMBODIMENTS

FIGS. 1 to 7 show a utility vehicle according to the present invention, and on the basis of these drawings, an embodiment of the present invention will be described. For convenience of explanation, an advancing direction of the utility vehicle is explained as the "front" of the utility vehicle and the respective components thereof, and the left-right direction as viewed from the driver or the passenger of the vehicle is explained as the "left-right direction" of the vehicle and the respective components thereof.

Figure 1:
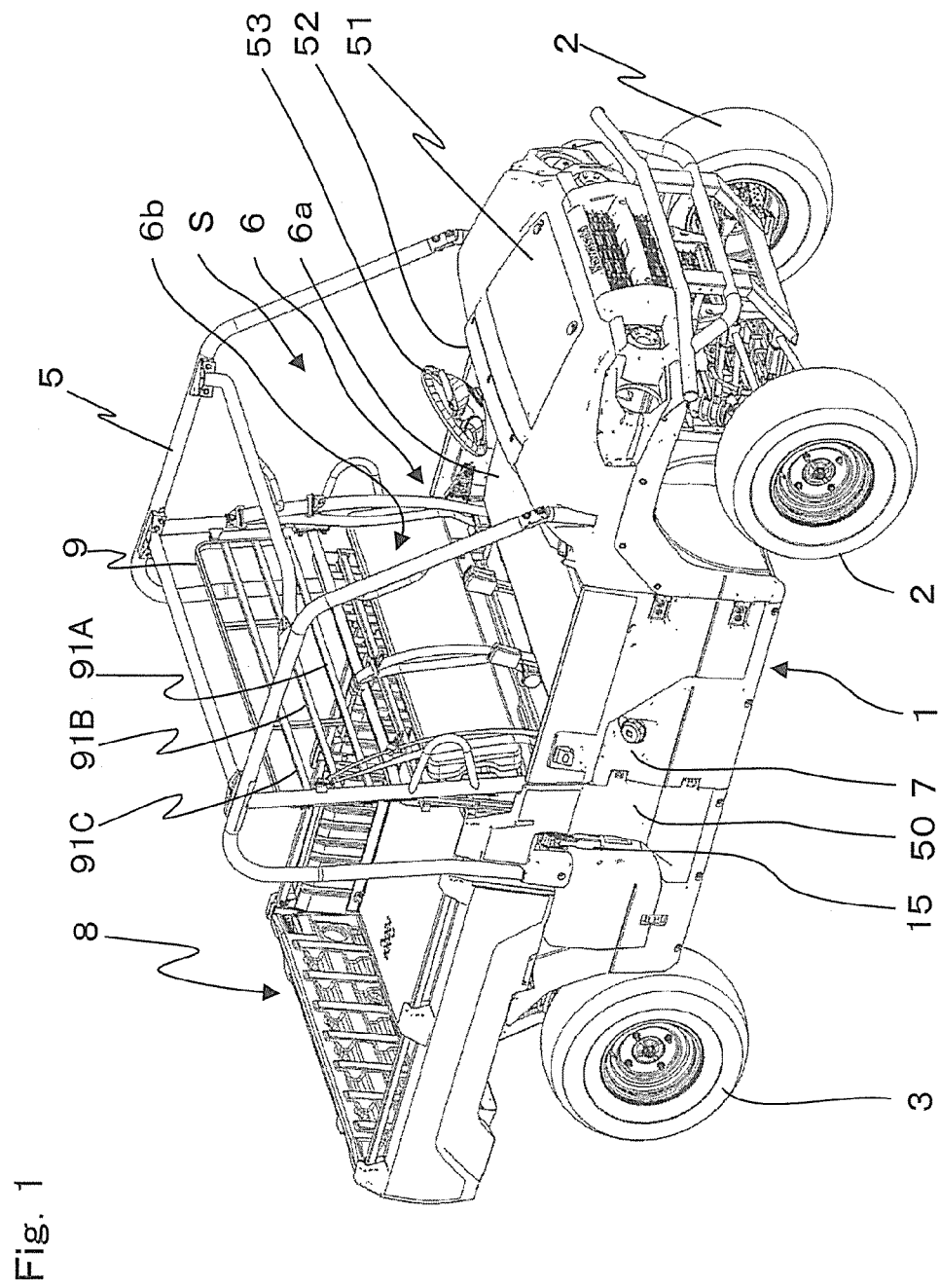
FIG. 1 is a perspective view in which a utility vehicle according to the present invention is viewed from obliquely front right.

FIG. 1 is a perspective view in which a utility vehicle according to the present invention is viewed from obliquely front right. The utility vehicle is used mainly for running in off-road circumstances like a grass field, a gravel field, and a sand field as well as an unpaved mountain path, an unpaved path through woods, a mud path, and a rocky field.

As shown in FIG. 1, the utility vehicle comprises a chassis 1, left and right front wheels 2 disposed at a front end portion of the chassis 1, and left and right rear wheels 3 disposed at a rear end portion of the chassis 1. A side cover 50 for covering a side of the chassis 1 is provided in each side-part of the chassis 1. A riding space (cabin) S is positioned between the front wheels 2 and the rear wheels 3 in a front-rear direction, and is enclosed with a R.O.P.S. 5. The R.O.P.S. is an abbreviation for rollover protective structure. A bench-type seat 6 is arranged in the riding space S. The seat 6 has a one-row seat configuration. A fuel tank 7 is provided under the seat 6. A cargo bed 8 is provided behind the seat 6. The front part of the cargo bed 8 is provided with a pair of right and left cargo bed locking parts 15 for locking the cargo bed 8 to the chassis 1. On the inner side of the chassis 1 under the cargo bed 8, an engine room (not shown) is formed on which an engine and a transmission are mounted. A screen 9 is arranged between the cargo bed 8 and the cabin space S above a back rest 6b of the seat 6. A bonnet 51 is provided in front of the cabin space S. A dashboard 52 is provided in an upper rear end part of the bonnet 51. In the dashboard 52, a steering wheel device 53 and a shift lever device (not shown) are provided within a region permitting operation by the driver sitting on a driver region 6a of the seat 6.

The screen 9 is attached to the R.O.P.S. 5. The screen 9 has three crossbars 91A, 91B, and 91C extending substantially horizontally in the vehicle width direction. The three crossbars 91A, 91B, and 91C are located at equal intervals in the vertical direction.

Figure 2:
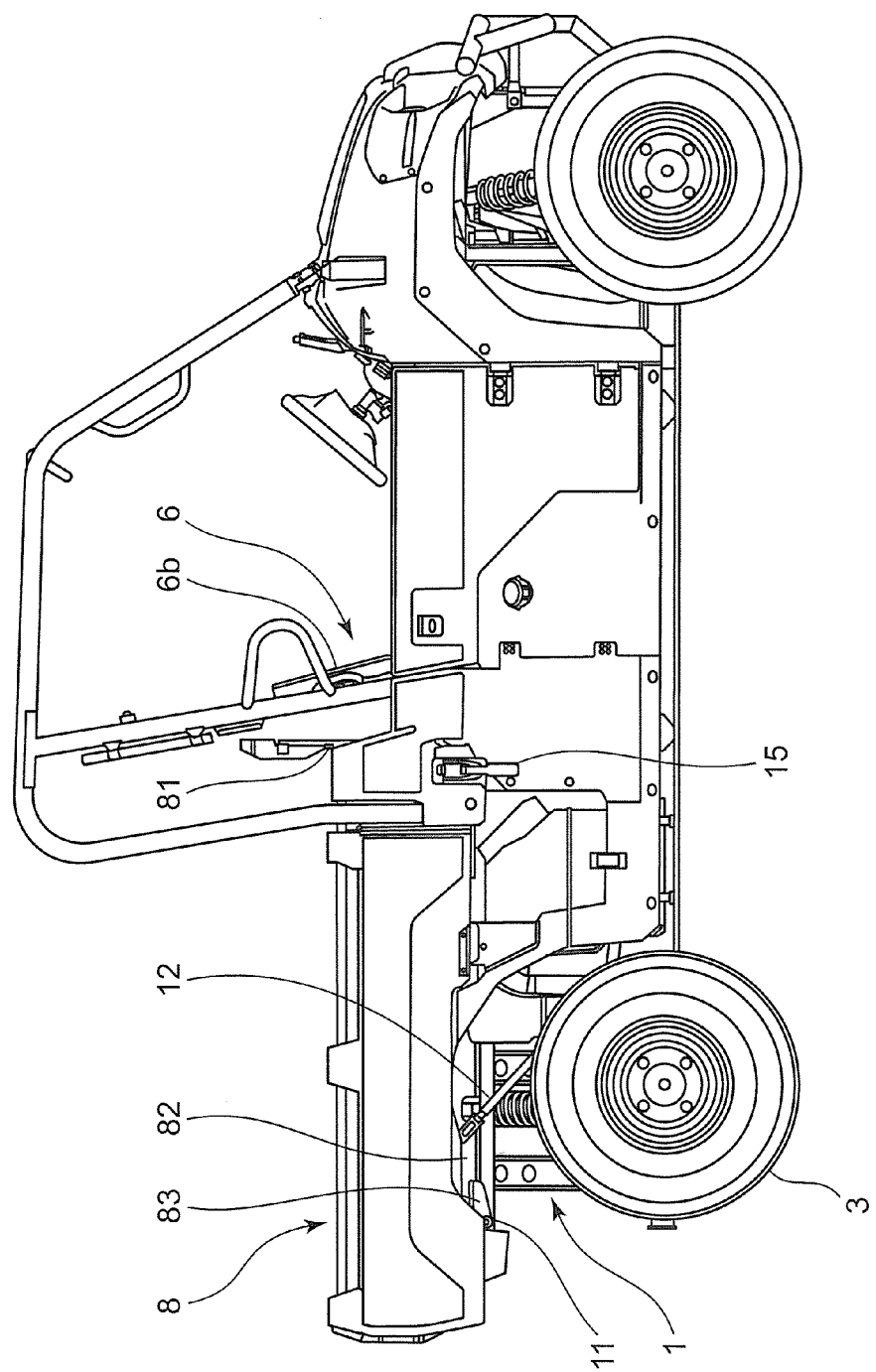
FIG. 2 is a right side view of the utility vehicle.

FIG. 2 is a right side view of the utility vehicle. FIG. 2 shows a situation in which the cargo bed 8 is located at the normal position (a non-dumping position).

As shown in FIG. 2, the cargo bed 8 extends from a vicinity of the back rest 6b of the seat 6 to the rear side of the rear wheels 3 in a substantially horizontal direction. That is, the cargo bed 8 is located at the normal position. The cargo bed 8 has a front end part 81, a lower frame 82, and a bracket 83 provided in a rear end part of the lower frame 82. A support rod (not shown) for supporting the cargo bed 8 is attached to a front end part of the lower frame 82.

A pivot 11 is inserted into the bracket 83. The pivot 11 is provided in a rear end part of the chassis 1. The cargo bed 8 is supported in a freely rotatable manner about the pivot 11. Thus, the front end part 81 of the cargo bed 8 can be raised and lowered about the pivot 11. That is, a dumping operation can be performed.

An air cylinder (gas damper) 12 serving as an assist mechanism is attached to a rear part of the lower frame 82 of the cargo bed 8. The air cylinder 12 is located in front of the bracket 83 and above the rear wheels 3. A tip part of a piston rod (not shown) of the air cylinder 12 is attached to the chassis 1. The air cylinder 12 biases the cargo bed 8 toward the dumping position so as to hold the cargo bed 8. Here, the air cylinder 12 is an example of the holding part.

Figure 3:
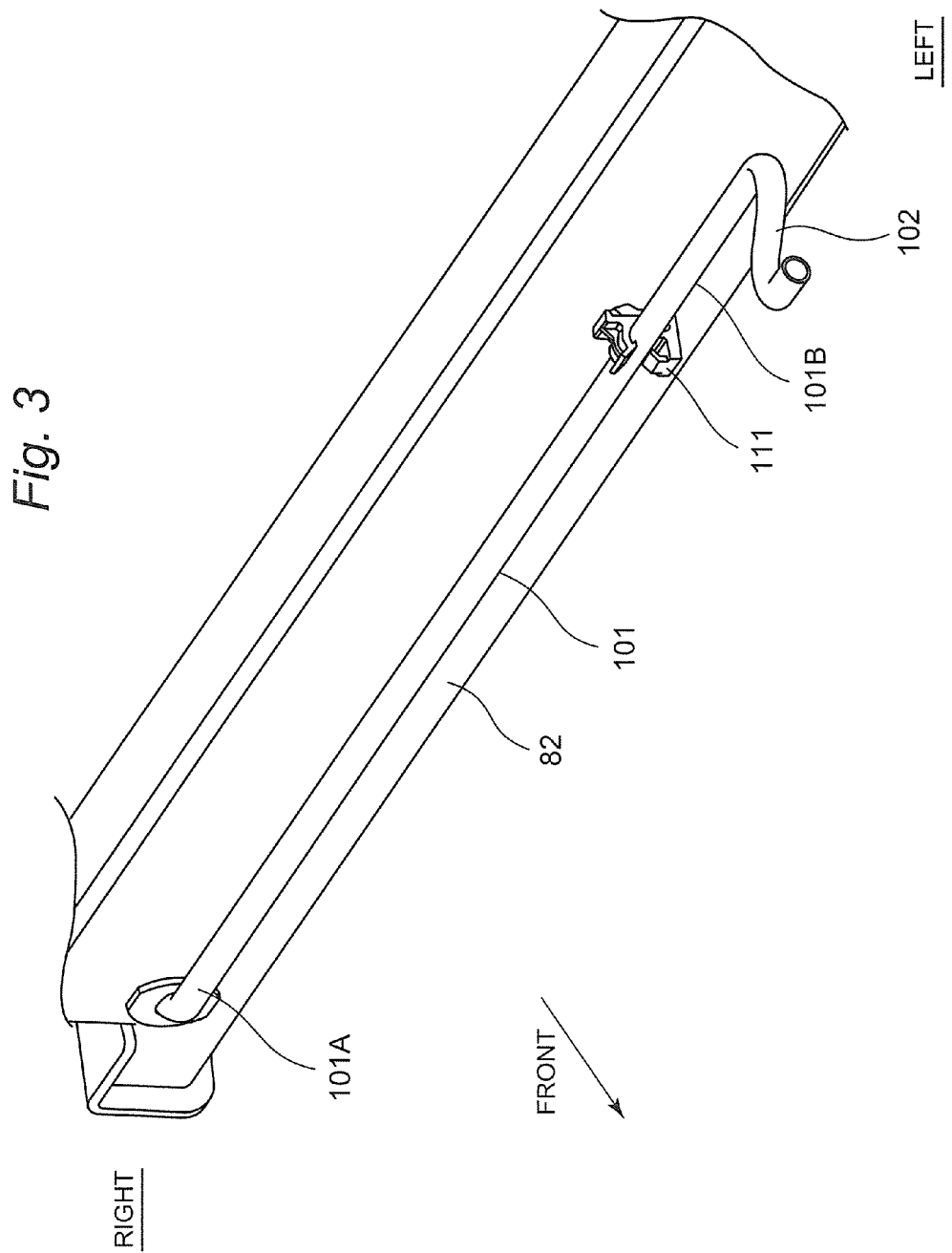
FIG. 3 is a perspective view showing a situation in which a support rod of the utility vehicle is stored in a cargo bed.

FIG. 3 is a perspective view showing a situation in which a support rod 101 of the utility vehicle is stored in the cargo bed 8.

As shown in FIG. 3, the support rod 101 is made of a metal round bar, for example, having a diameter 8 mm and a length of 800 mm. When the support rod 101 is stored in the cargo bed 8, the support rod 101 extends in the vehicle width direction along the front face of the lower frame 82 of the cargo bed 8. An engaging recess 111 made of is provided in the front face of the lower frame 82. The engaging recess 111 is opened frontward. The other end part 101B of the support rod 101 is engaged with the engaging recess 111.

One end part 101A of the support rod 101 is attached to a front lower right end part of the lower frame 82 of the cargo bed 8 in a freely rotatable manner. The tip of the other end part 101B of the support rod 101 is bent into a substantial S-shape so as to form a hook 102 so as to be locked to a crossbar 91A, 91B, or 91C of the screen 9.

Figure 4:
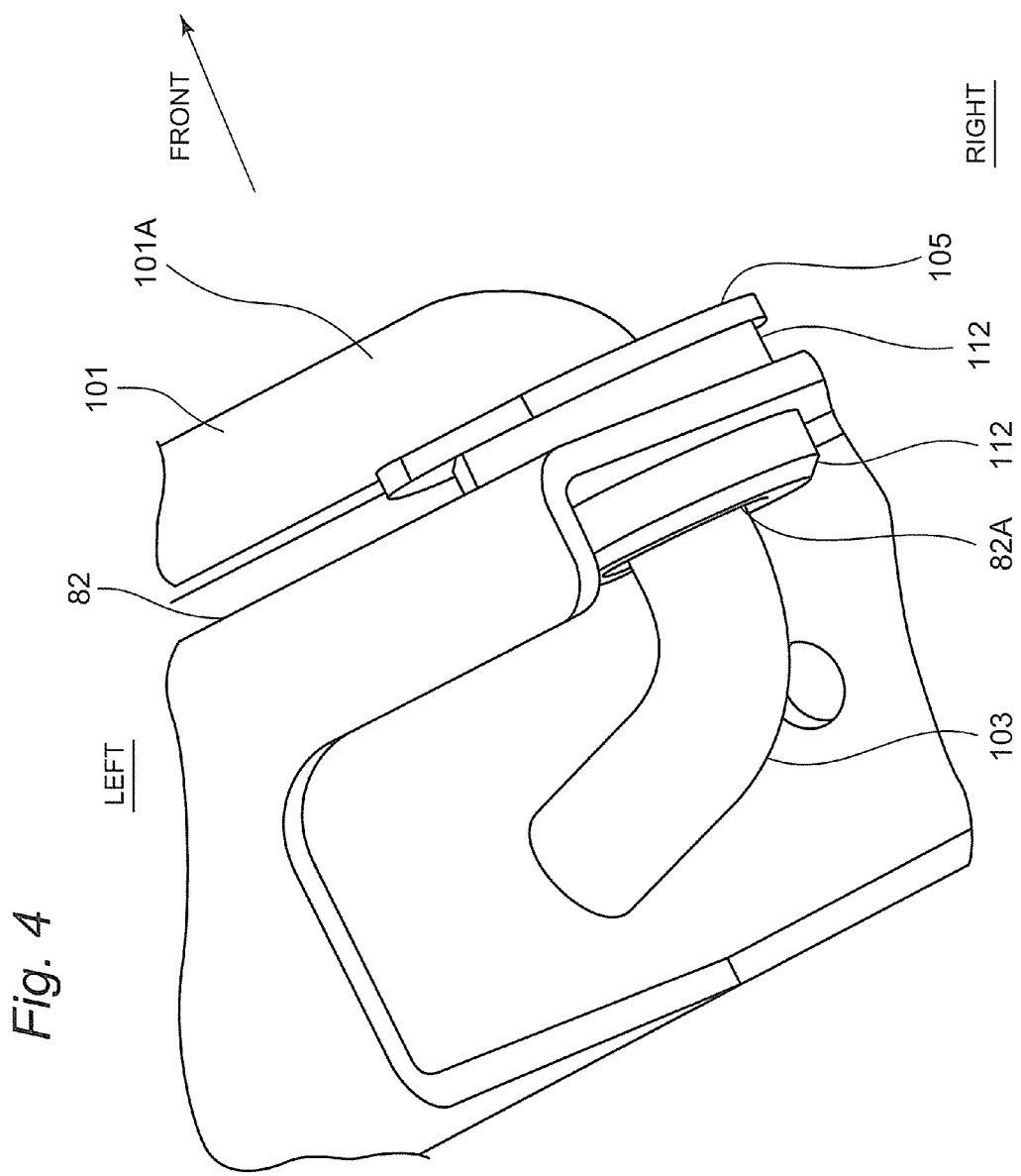
FIG. 4 is an enlarged perspective view showing one end part of the support rod in an enlarged manner.

FIG. 4 is an enlarged perspective view showing the one end part 101A of the support rod 101 in an enlarged manner.

As shown in FIG. 4, the tip of the one end part 101A of the support rod 101 is bent into a substantial U-shape so as to form an attaching part 103. The attaching part 103 is inserted into a hole 82A provided in a front lower right end part of the lower frame 82 and into a grommet 112 which is made of rubber and attached to an edge part of the hole 82A. A plate-shaped member 105 having a substantially circular shape is attached to the attaching part 103 by welding. The plate-shaped member 105 extends substantially in parallel to the front face of the lower frame 82. The plate-shaped member 105, the grommet 112, and the attaching part 103 prevent the support rod 101 from escaping from the hole 82A of the lower frame 82 and restricts a movable range of the support rod 101.

Figure 5:
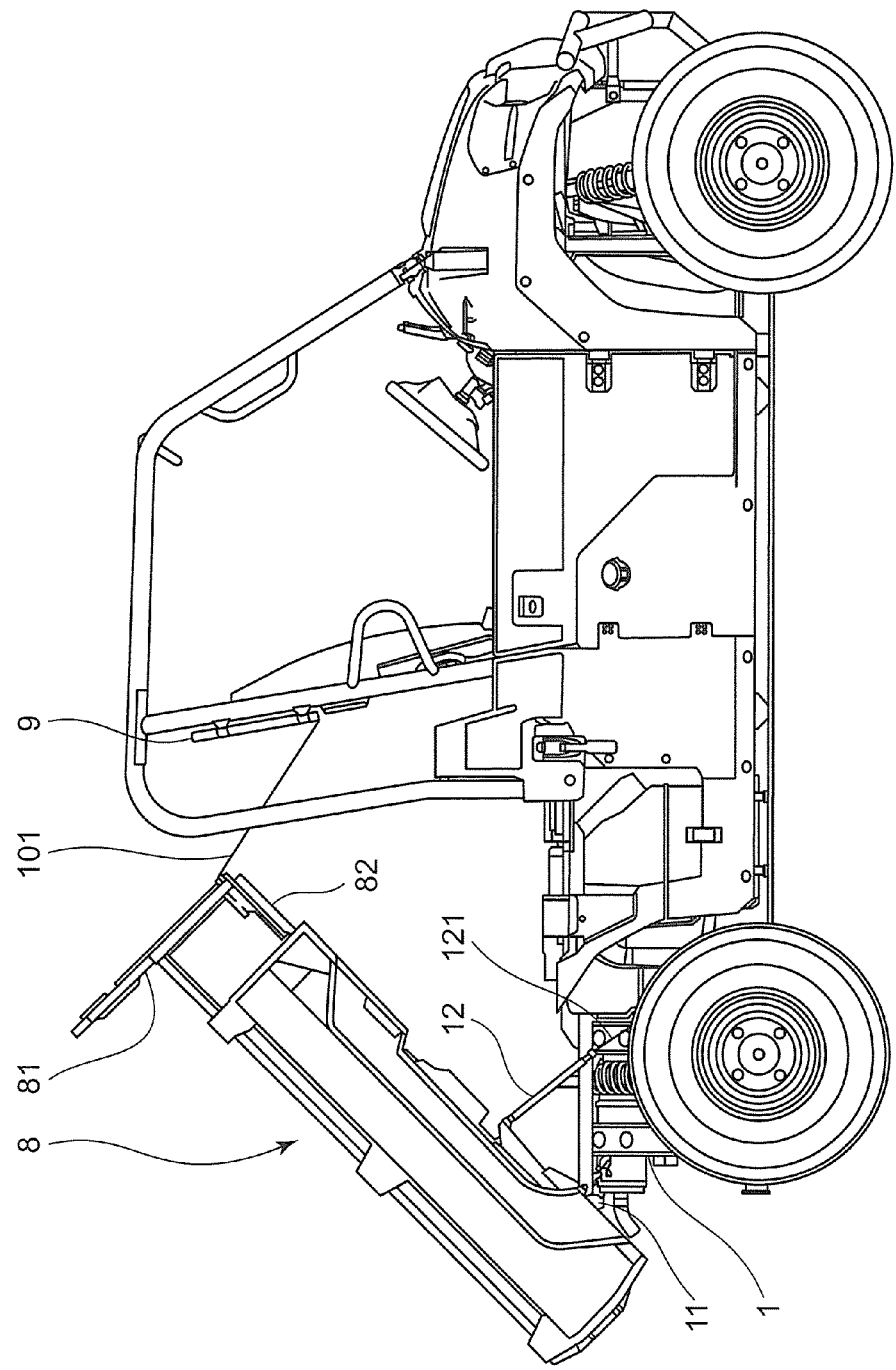
FIG. 5 is a right side view of a utility vehicle in a situation in which a cargo bed of the utility vehicle is raised to a dumping position.

A dumping operation of the cargo bed 8 is described below with reference to FIGS. 2 and 5. FIG. 5 shows a situation in which the cargo bed 8 has been raised to the dumping position.

First, the locked state of the cargo bed locking parts 15 is released. Then, as shown in FIG. 5, the front end part 81 of the cargo bed 8 is raised by manual operation with utilizing the biasing force of the air cylinder 12. As such, the front end part 81 of the cargo bed 8 is rotated about the pivot 11 so that the cargo bed 8 is rotated from the normal position to the dumping position. The dumping position is determined by the stroke limit of the air cylinder 12. Then, the cargo bed 8 is held at the dumping position by the biasing force of the air cylinder 12.

Then, the end part of the support rod 101 is locked to a crossbar of the screen 9. When locked to the crossbar of the screen 9, in side view, the support rod 101 extends in a direction of approximately 90 degrees relative to the lower frame 82 of the cargo bed 8.

Figure 6:
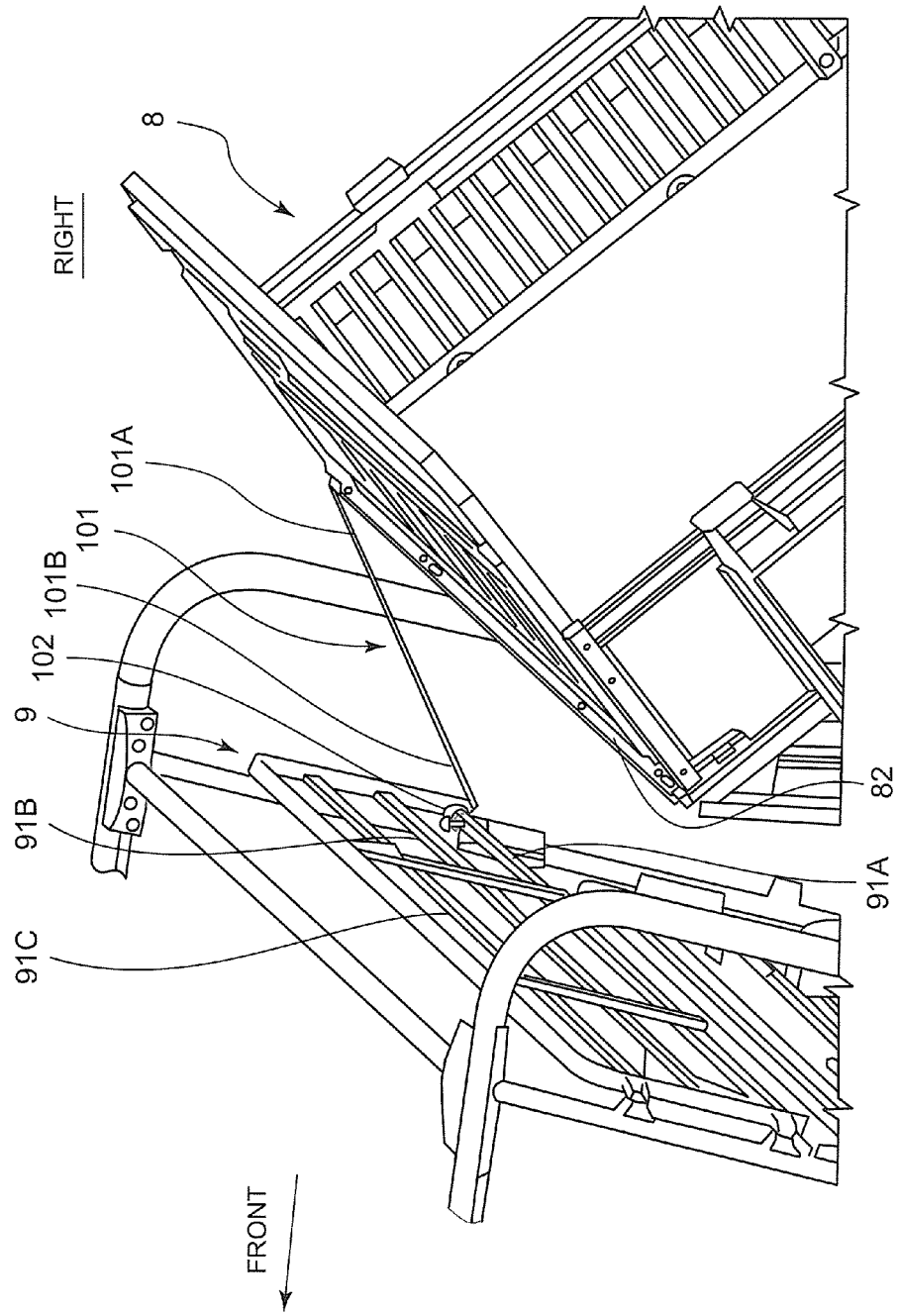
FIG. 6 is a perspective view in which a situation in which the support rod is locked to a crossbar of a screen of the utility vehicle is viewed from obliquely rear left.

FIG. 6 is a perspective view in which a situation that the cargo bed 8 has been raised to the dumping position is viewed from obliquely rear left.

As shown in FIG. 6, the hook 102 of the support rod 101 is locked to the crossbar 91A of the screen 9. Thus, the crossbar 91A extends at a position lower than the other crossbars 91B and 91C of the screen 9.

Figure 7:
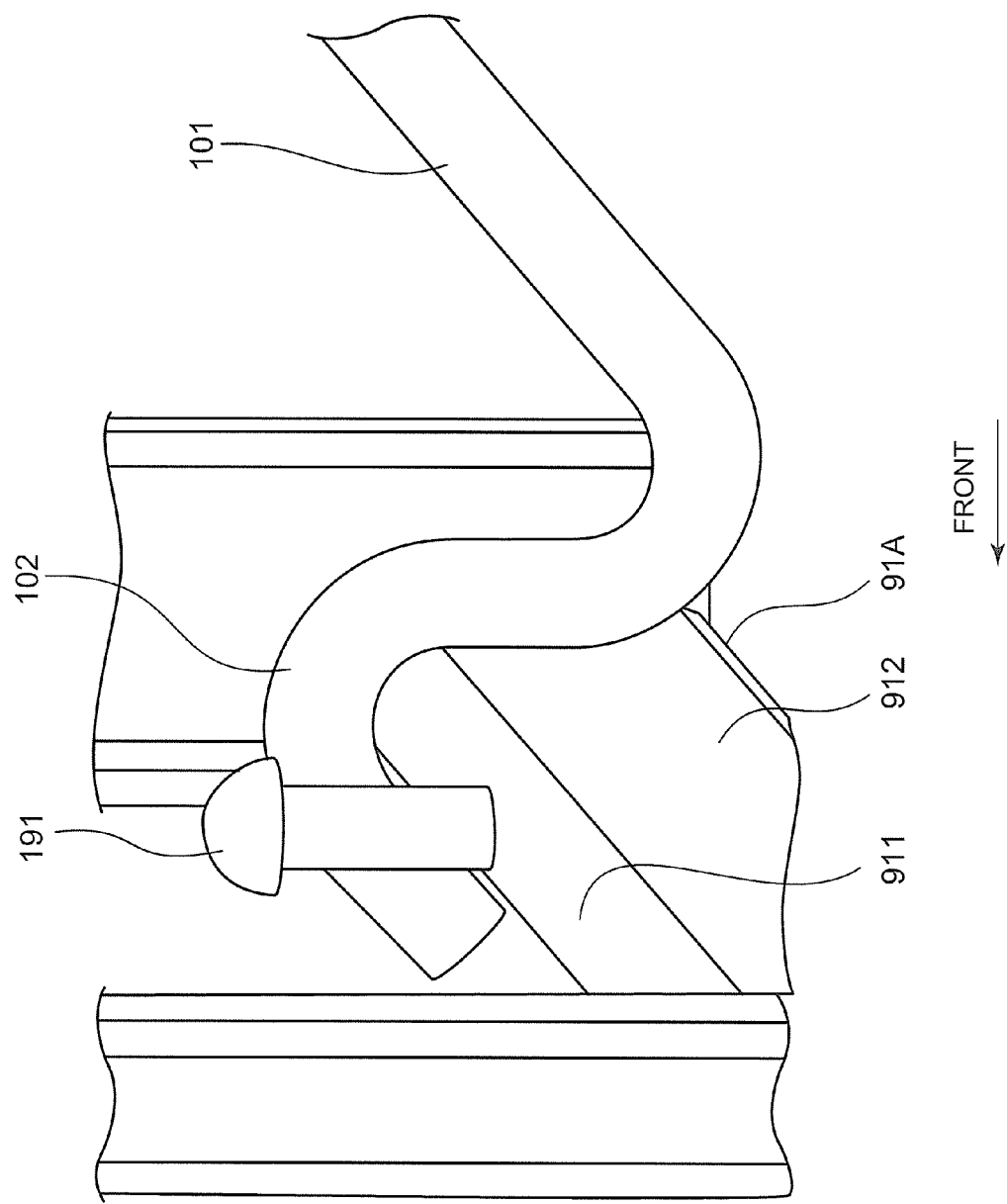
FIG. 7 is an enlarged perspective view showing a vicinity of a hook of the support rod of FIG. 6 in an enlarged manner.

FIG. 7 is an enlarged perspective view showing a vicinity of the hook 102 of the support rod 101 in an enlarged manner.

As shown in FIG. 7, the crossbar 91A has a substantially rectangular parallelepiped shape. The crossbar 91A is provided with a restriction pin 191 protruding upward from the upper face 911 of the crossbar 91A. The restriction pin 191 has substantially the same shape as a round-head bolt including a cylindrical part and a hemispherical part provided at one end of the cylindrical part. Then, the restriction pin 191 prevents the hook 102 of the support rod 101 from moving along the crossbar 91A in the vehicle width direction.

A portion of the hook 102 of the support rod 101 extends on the rear face 912 of the crossbar 91A. Thus, the hook 102 and the crossbar 91A are in line contact with each other so that the load on the cargo bed 8 is distributed and transmitted through the hook 102 to the crossbar 91A.

Advantage of the Embodiment (1) Since the utility vehicle comprises: the air cylinder 12 for biasing the cargo bed 8 toward the dumping position so as to hold the cargo bed 8; and the support rod 101 provided separately from the air cylinder 12 and supporting the cargo bed 8 at the dumping position, the air cylinder 12 can bias and raise the cargo bed 8 to the dumping position and then can hold the cargo bed 8 at a predetermined dumping position by means of the biasing force of the air cylinder 12. Also, the cargo bed 8 can be held at a predetermined dumping position by the support rod 101. Thus, even if the outside air temperature becomes extremely low so that the biasing force of the air cylinder 12 decreases, the cargo bed 8 can be held at a predetermined dumping position by the support rod 101. That is, the cargo bed 8 can be held at a predetermined dumping position regardless of the outside air temperature. Further, by virtue of this, for example, when the engine or the like is to be checked, a workspace for the operator can reliably be ensured.

(2) Since the one end part 101A of the support rod 101 is attached to the cargo bed 8 in a freely rotatable manner so that the support rod 101 can be moved between the storage position and the supporting position, for example, when the cargo bed 8 is to be raised or lowered, storing the support rod 101 in the storage position, except for a situation in which the cargo bed 8 is to be supported, prevents the support rod 101 from disturbing the raising or lowering of the cargo bed 8 or being lost.

(3) Since the hook 102 of the support rod 101 can be locked to the crossbar 91A, 91B, or 91C of the screen 9, it is not necessary to provide separately a to-be-locked member for locking the hook 102 of the support rod 101 in the chassis 1 or the like.

(4) Since the screen 9 has the plurality of crossbars 91A, 91B, and 91C, when a different crossbar is used for locking the hook 102 of the support rod 101, the dumping position of the cargo bed 8 can be changed. Thus, for example, when the engine or the like is to be checked, the dumping position of the cargo bed 8 can be changed depending on the necessity so that a sufficient workspace can be ensured.

(5) Since the crossbar 91A of the screen 9 has the restriction pin 191 and then the restriction pin 191 restricts the lock position for the hook 102 in the vehicle width direction, the lock position for the hook 102 in the vehicle width direction can be stabilized so that the cargo bed 8 can be held stably at a predetermined dumping position.

Other Embodiments (1) In the above-mentioned embodiment, the one end part 101A of the support rod 101 has been attached to a front right end part of the lower frame 82 of the cargo bed 8. However, employable configurations are not restricted to this. For example, the one end part of the support rod may be attached to the center or a left end of the front end part of the lower frame of the cargo bed. Further, the support rod may be attached to the chassis or, alternatively, attached in a detachable manner to the cargo bed or the chassis.

(2) In the above-mentioned embodiment, when the support rod 101 has been stored in the cargo bed 8, the support rod 101 has extended in the vehicle width direction along the front end part of the lower frame 82 of the front end part 81 of the cargo bed 8. However, employable configurations are not restricted to this. For example, the support rod may be located in the frontward and rearward directions along the lower frame of the cargo bed or, alternatively, may be stored in the frame of the cargo bed.

(3) In the above-mentioned embodiment, the support rod 101 is made of a metal round bar. However, employable configurations are not restricted to this. For example, the support rod may have another shape such as a square bar and a hollow pipe. Further, the support rod may be capable of expansion and contraction or, alternatively, may be foldable.

(4) In the above-mentioned embodiment, the hook 102 of the support rod 101 is locked to the crossbar 91A of the screen 9. However, employable configurations are not restricted to this. For example, the hook may be locked to another crossbar of the screen. Alternatively, a to-be-locked member may be provided in the ROPS, the chassis, or the like and then the hook may be locked to the to-be-locked member. Further, a hole may be provided in the crossbar of the screen and then the hook may be locked to the hole.

(5) In the above-mentioned embodiment, the tip of the other end part 101B of the support rod 101 is bent into a substantial S-shape so as to form the hook 102. However, employable configurations are not restricted to this. For example, the tip of the support rod may be bent into another shape such as a V-shape. Further, another member to be locked to the crossbar of the screen may be attached to the tip of the support rod.

(6) In the above-mentioned embodiment, the restriction pin 191 is protruded upward from the upper face 911 of the crossbar 91A. However, employable configurations are not restricted to this. That is, it is sufficient that the lock position of the hook 102 of the support rod 101 can be restricted in the vehicle width direction. For example, a restriction pin may be provided so as to protrude rearward from the rear face of the crossbar. Alternatively, a slot may be provided in the crossbar and then the support rod may be locked to the slot.

(7) In the above-mentioned embodiment, the restriction pin 191 is provided in the crossbar 91A alone. However, employable configurations are not restricted to this. That is, a restriction pin may be provided in each of the plurality of crossbars 91A, 91B, and 91C.

(8) In the above-mentioned embodiment, the air cylinder 12 is provided. However, employable configurations are not restricted to this. That is, another holding part such as a hydraulic cylinder may be employed.

(9) In the above-mentioned embodiment, the seat 6 has a one-row seat configuration. Instead, the seat 6 may have a two-row seat configuration or a three-or-more row seat configuration.

(10) The present invention is not limited to the structure of the above-mentioned embodiment. That is, various kinds of modifications are included as long as they do not depart from the scope described in the claims.

What is claimed is:
1. A utility vehicle comprising:
a chassis;
at least one seat row arranged on the chassis;
a cargo bed arranged behind the at least one seat row and supported in a freely rotatable manner about a pivot of the chassis so as to be changeable between a dumping position in which a front portion of the cargo bed is raised and a normal position in which the front portion of the cargo bed is not raised;
a holding part for biasing the cargo bed toward the dumping position so as to hold the cargo bed;
a support rod provided separately from the holding part and supporting the cargo bed at the dumping position; and
a screen provided between the at least one seat row and the cargo bed,
wherein the screen has at least one crossbar extending in a vehicle width direction;
wherein the support rod has a hook at a distal end thereof; and
wherein the hook can be engaged to the crossbar.

2. The utility vehicle according to claim 1, wherein
the support rod is attached to the cargo bed in a freely rotatable manner at a proximal end thereof; and
the support rod can be moved between a storage position of being stored in the cargo bed and a supporting position of supporting the cargo bed.

3. The utility vehicle according to claim 1, wherein the screen has a plurality of crossbars.

4. The utility vehicle according to claim 1, wherein the crossbar of the screen has a restriction pin for restricting a lock position for the hook in a vehicle width direction.

* * * * *